(12) United States Patent
Nishida

(10) Patent No.: US 10,614,348 B2
(45) Date of Patent: Apr. 7, 2020

(54) IMAGE FORMING APPARATUS AND IMAGE FORMING METHOD

(71) Applicant: KYOCERA Document Solutions Inc., Osaka (JP)

(72) Inventor: Atsushi Nishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/403,987

(22) Filed: May 6, 2019

(65) Prior Publication Data
US 2019/0347531 A1    Nov. 14, 2019

(30) Foreign Application Priority Data
May 11, 2018 (JP) ................. 2018-092325

(51) Int. Cl.
*G06K 15/02* (2006.01)
*H04N 1/00* (2006.01)

(52) U.S. Cl.
CPC ....... *G06K 15/1843* (2013.01); *H04N 1/0027* (2013.01); *H04N 1/00254* (2013.01); *G06K 2215/0057* (2013.01)

(58) Field of Classification Search
None
See application file for complete search history.

(56) References Cited

U.S. PATENT DOCUMENTS 9,633,290 B2 * 4/2017 Nagai ................ G03G 15/0115
2002/0184196 A1 * 12/2002 Lehmeier ................ G06F 16/38

FOREIGN PATENT DOCUMENTS

JP    2005234391 A    9/2005

* cited by examiner

*Primary Examiner* — Lennin R Rodriguezgonzalez
(74) *Attorney, Agent, or Firm* — Studebaker & Brackett PC

(57) ABSTRACT

Provided is an image forming apparatus including an image formation unit, a character size decision unit, a generation unit, and a replacement unit. The image formation unit forms an image on paper. The character size decision unit decides a size of a character included in a second text image, based on an image including a photographic image and a first text image. The generation unit generates a descriptive sentence of the photographic image. The replacement unit replaces the photographic image with the second text image. The second text image indicates a text image corresponding to the descriptive sentence.

8 Claims, 7 Drawing Sheets

IMAGE FORMING APPARATUS AND IMAGE FORMING METHOD

INCORPORATION BY REFERENCE

This application is based upon 35 U.S.C. § 119 and claims the benefit of priority from corresponding Japanese Patent Application No. 2018-092325, filed in the Japan Patent Office on May 11, 2018, the entire contents of which are incorporated herein by reference.

BACKGROUND

Field of the Invention

The present disclosure relates to an image forming apparatus and an image forming method.

Description of Related Art

There is a certain image forming apparatus in which a reduction rate of a pixel is changed according to a type of an image such as a character area and a photo area in a document in an eco mode where printing is performed with a consumption amount of toner reduced as compared to a usual consumption amount of toner.

SUMMARY

An image forming apparatus according to the present disclosure includes an image formation unit, a character size decision unit, a generation unit, and a replacement unit. The image formation unit forms an image on a recording medium. The character size decision unit decides a size of a character included in a second text image, based on an image including a photographic image and a first text image. The generation unit generates a descriptive sentence of the photographic image. The replacement unit replaces the photographic image with the second text image. The second text image indicates a text image corresponding to the descriptive sentence.

An image forming method according to the present disclosure is an image forming method of an image forming apparatus for forming an image on a recording medium. The image forming method includes: a character size decision step of deciding a size of a character included in a second text image, based on an image including a photographic image and a first text image; a generation step of generating a descriptive sentence of the photographic image; and a replacement step of replacing the photographic image with the second text image. The second text image indicates a text image corresponding to the descriptive sentence.

DETAILED DESCRIPTION

Figure 1:
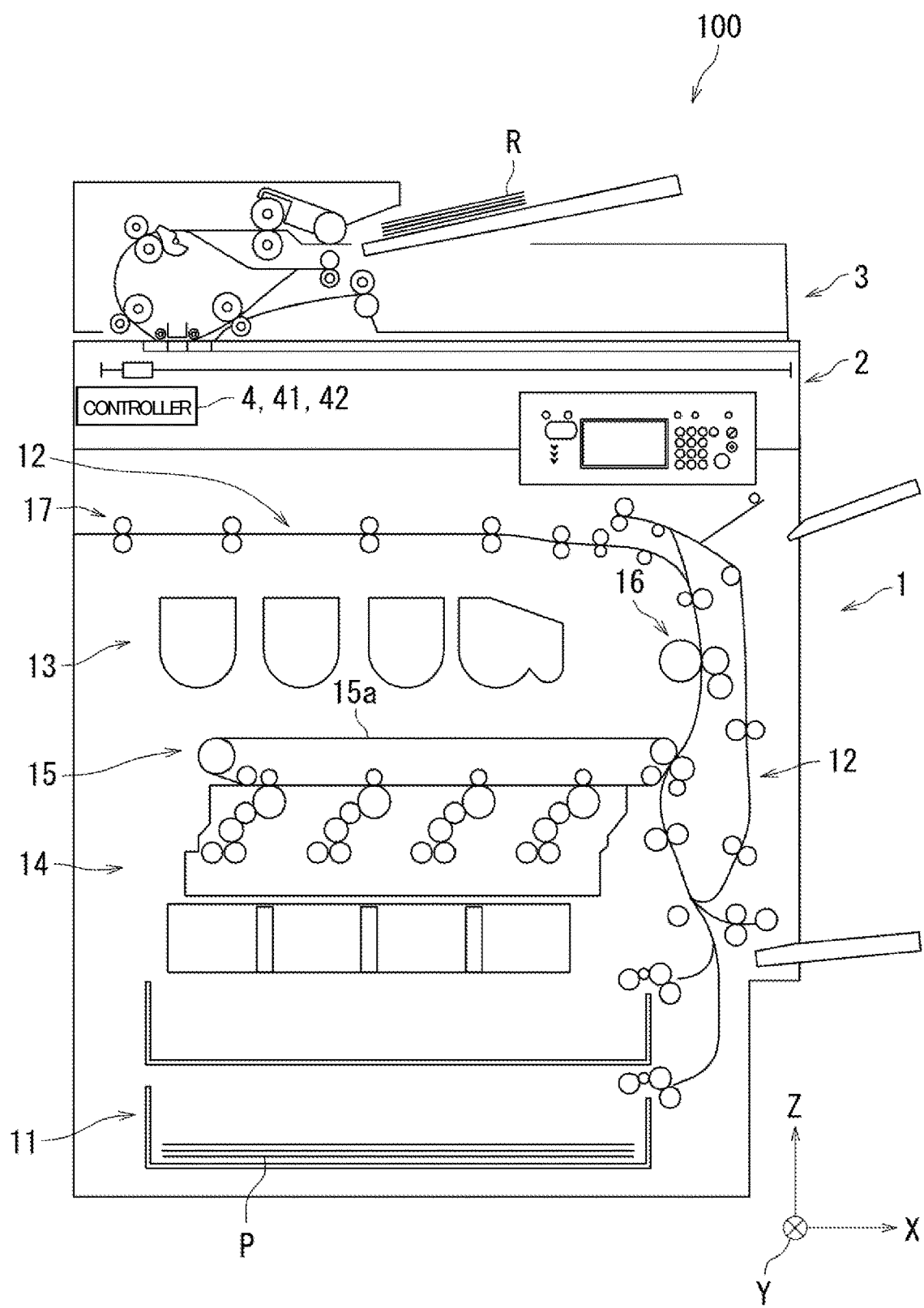
FIG. 1 is a diagram illustrating an example of a configuration of an image forming apparatus according to an embodiment of the present disclosure.

An embodiment of the present disclosure will be described with reference to FIG. 1 to FIG. 7 below. In the drawings, like reference numerals will be used for identical or corresponding parts to omit duplicate descriptions.

First, a configuration of an image forming apparatus 100 according to the embodiment of the present disclosure will be described with reference to FIG. 1. FIG. 1 is a diagram illustrating an example of a configuration of the image forming apparatus 100. The image forming apparatus 100 is a color multifunction peripheral.

As illustrated in FIG. 1, the image forming apparatus 100 includes an image formation unit 1, an image reading unit 2, a document conveyance unit 3, and a controller 4. The image formation unit 1 forms an image on paper P. The paper P is an example of a recording medium. The image reading unit 2 reads the image of a document R to generate image information. The document conveyance unit 3 conveys the document R to the image reading unit 2. The controller 4 controls an operation of the image forming apparatus 100. Although not illustrated in FIG. 1, the image forming apparatus 100 includes a power supply, a communication board, and the like as in a normal color multifunction peripheral.

In FIG. 1, an X axis, a Y axis, and a Z axis orthogonal to one another are described. The X axis and the Y axis are parallel to a horizontal plane. The Z axis is parallel to a vertical direction. In the following description, a positive direction side of the Y axis may be referred to as "back side" and a negative direction side of the Y axis may be referred to as "front side".

The image formation unit 1 includes a feeding unit 11, a conveyance unit 12, a toner supply unit 13, an image formation section 14, a fixation unit 16, and a discharge unit 17. The image formation section 14 includes a transfer unit 15.

The feeding unit 11 supplies the paper P to the conveyance unit 12. The conveyance unit 12 conveys the paper P to the discharge unit 17 via the transfer unit 15 and the fixation unit 16.

A toner container is attached to the toner supply unit 13. The toner container supplies toner to the image formation section 14. The image formation section 14 forms an image on the paper P. The image formation section 14 includes a color formation unit for each toner in cyan, magenta, yellow, and black supplied from the toner supply unit 13. Each color formation unit includes an exposure unit, a photosensitive drum, a developing unit having a developing roller, a charging roller, and a cleaning blade. The transfer unit 15 includes an intermediate transfer belt 15a.

The image formation section 14 transfers toner images in cyan, magenta, yellow, and black onto the intermediate transfer belt 15a. Toner images having a plurality of colors are superimposed on the intermediate transfer belt 15a, and an image is formed on the intermediate transfer belt 15a. The transfer unit 15 transfers the image formed on the intermediate transfer belt 15a onto the paper P. As a result, the image is formed on the paper P.

The fixation unit 16 heats and presses the paper P to fix the image formed on the paper P onto the paper P. The discharge unit 17 discharges the paper P to outside the image forming apparatus 100.

The controller 4 includes a processor 41 and a storage unit 42. The processor 41 includes, for example, a CPU (Central Processing Unit). The storage unit 42 includes a memory such as a semiconductor memory. The storage unit 42 may include an HDD (Hard Disk Drive). The storage unit 42 stores a control program. The processor 41 controls the operation of the image forming apparatus 100 by executing the control program.

Figure 2A:
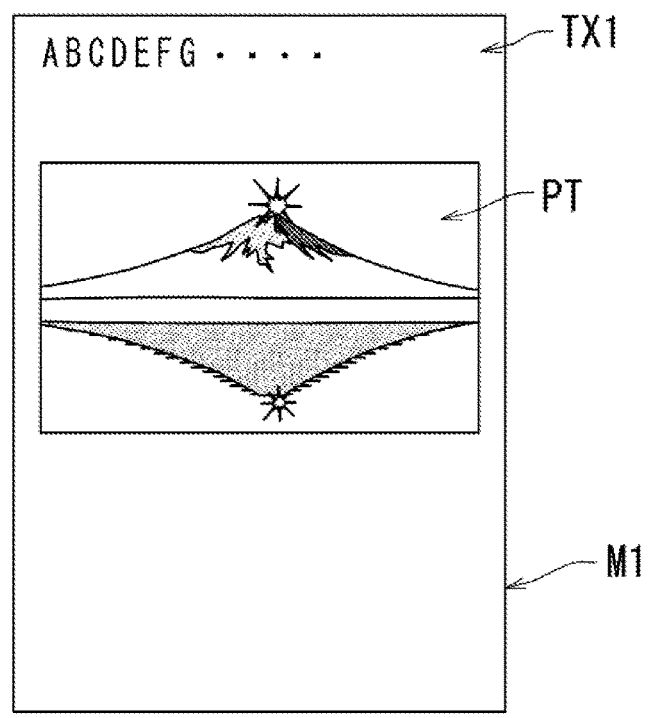
FIG. 2A is a diagram illustrating a first image.
Figure 2B:
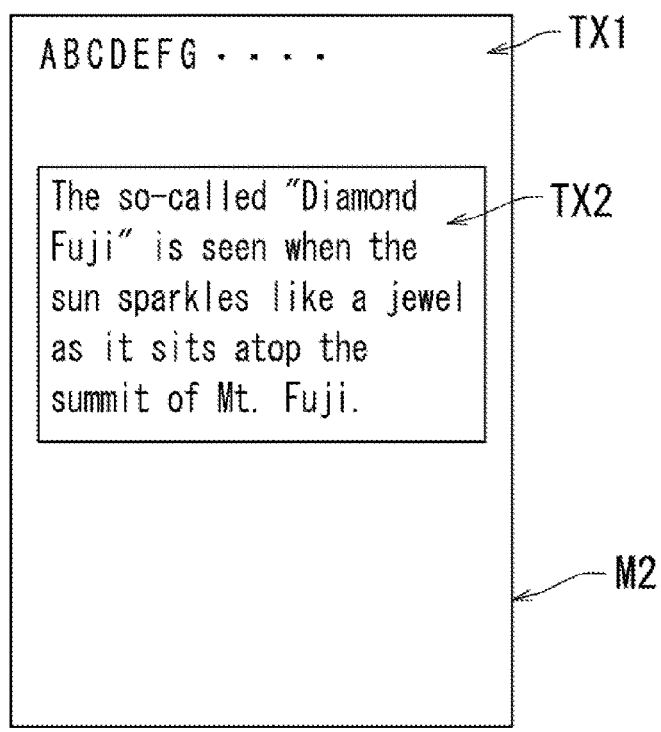
FIG. 2B is a view illustrating a second image.

Next, a configuration of the controller 4 will be described with reference to FIG. 2 to FIG. 7. FIG. 2A is a diagram illustrating a first image M1. FIG. 2B is a diagram illustrating a second image M2.

The first image M1 illustrated in FIG. 2A includes a first text image TX1 and a photographic image PT. A size SZ of a character included in the first text image TX1 is a first size SZ1. A typeface TP of the character included in the first text image TX1 is TP1. The first text image TX1 includes a character object, a numeric object, and a mark object.

The character object includes an object corresponding to each of a kanji (Chinese) character, a hiragana (Japanese) character, katakana (Japanese) character, and an alphabet. The numeric object includes an object corresponding to each of an Arabic numeral, a Roman numeral, and a Chinese numeral. The mark object includes an object corresponding to each of various types of marks such as a mathematical symbol, a circle, a triangle, and a rectangle.

The photographic image PT indicates, for example, a photograph. An area occupied by the photographic image PT in the first image M1 is a photographic image area AP. The photographic image area AP in the first image M1 has a size SAP.

The second image M2 illustrated in FIG. 2B includes the first text image TX1 and a second text image TX2. The first text image TX1 of FIG. 2B is the same as the first text image TX1 of FIG. 2A. The second text image TX2 of FIG. 2B is a descriptive sentence ET of the photographic image PT included in FIG. 2A. The size SZ of a character included in the second text image TX2 is a second size SZ2. The typeface TP of the character included in the second text image TX2 is a second typeface TP2.

Figure 3:
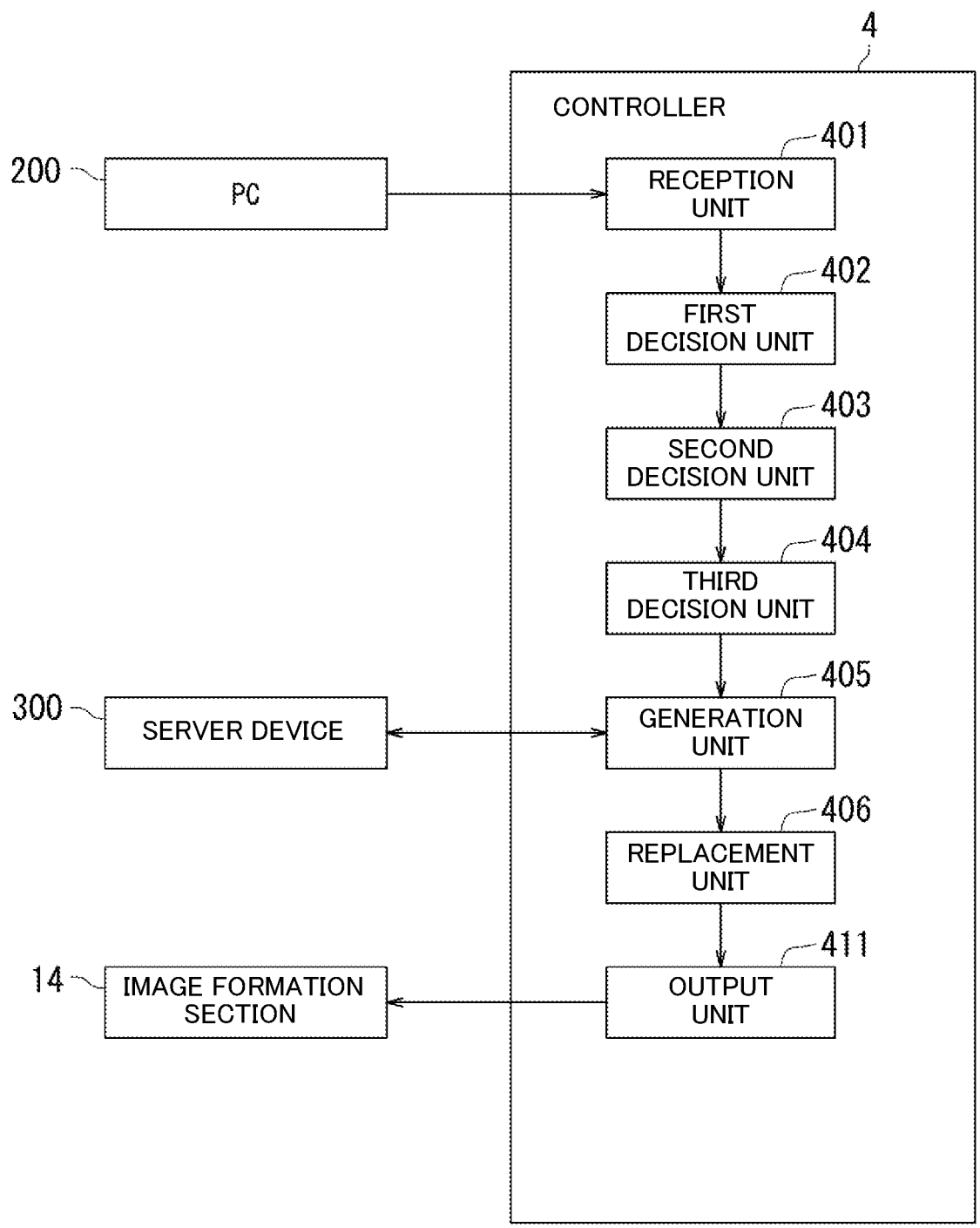
FIG. 3 is a diagram illustrating a part of a configuration of a controller according to the embodiment of the present disclosure.

Next, the configuration of the controller 4 according to the embodiment will be described with reference to FIG. 3. FIG. 3 is a diagram illustrating a part of the configuration of the controller 4 according to the embodiment of the present disclosure. The remaining part of the configuration of the controller 4 will be described with reference to FIG. 6.

The controller 4 includes a reception unit 401, a first decision unit 402, a second decision unit 403, a third decision unit 404, a generation unit 405, a replacement unit 406, and an output unit 411. Specifically, when the processor 41 of the controller 4 executes the control program stored in the storage unit 42, the processor 41 functions as the reception unit 401, the first decision unit 402, the second decision unit 403, the third decision unit 404, the generation unit 405, the replacement unit 406, and the output unit 411.

The reception unit 401 receives first image information MJ1 indicating the first image M1, from a personal computer (PC) 200.

The first decision unit 402 extracts the first text image TX1 from the first image information MJ1. Then, the first decision unit 402 evaluates the first size SZ1 that is the size of a character included in the first text image TX1. Finally, the first decision unit 402 decides the second size SZ2, based on the first size SZ1. The first decision unit 402 is an example of a character size decision unit.

The second size SZ2 indicates a size of a character included in the second text image TX2 displayed instead of the photographic image PT, in other words, a size of a character of the descriptive sentence ET. The second size SZ2 substantially matches or is smaller than the first size SZ1.

The second decision unit 403 obtains the first typeface TP1. The first typeface TP1 is a typeface of the character included in the extracted first text image TX1. Then, the second decision unit 403 decides the second typeface TP2 to be the same typeface as the first typeface TP1. The second typeface TP2 indicates the typeface of the character included in the second text image TX2, in other words, the typeface of the character of the descriptive sentence ET. The second decision unit 403 is an example of a typeface decision unit.

The third decision unit 404 decides a character count NC based on the size of the character decided by the first decision unit 402 and the typeface decided by the second decision unit 403. The character count NC is a character count of the descriptive sentence ET that can be described in an area combining the photographic image area AP and a blank space. The third decision unit 404 is an example of a character count decision unit.

The generation unit 405 uses an artificial intelligence of a server device 300 to generate the descriptive sentence ET of the photographic image PT. Specifically, the generation unit 405 extracts the photographic image PT from the first image information MJ1. Then, the generation unit 405 transmits the photographic image PT and the character count NC to the server device 300. The generation unit 405 receives the descriptive sentence ET from the server device 300. Finally, the generation unit 405 generates the second text image TX2 from the descriptive sentence ET.

The server device 300 receives the photographic image PT and the character count NC from the generation unit 405. The server device 300 uses the artificial intelligence to generate the descriptive sentence ET of the photographic image PT so that a character count falls within the character count NC. Then, the server device 300 transmits the generated descriptive sentence ET to the generation unit 405.

The server device 300 can use any well-known method using artificial intelligence without a particular limitation to generate the descriptive sentence ET. For example, deep learning can be used to generate the descriptive sentence ET.

The replacement unit 406 replaces the photographic image PT with the second text image TX2 when it is determined that the photographic image PT is appropriately replaced with the second text image TX2. The replacement unit 406 generates second image information MJ2 indicating the second image M2.

The output unit 411 outputs the second image information MJ2 to the image formation section 14. The output unit 411 controls the image formation section 14 so that the image formation section 14 forms the second image M2 on the paper P, based on a user's instruction.

Figure 4:
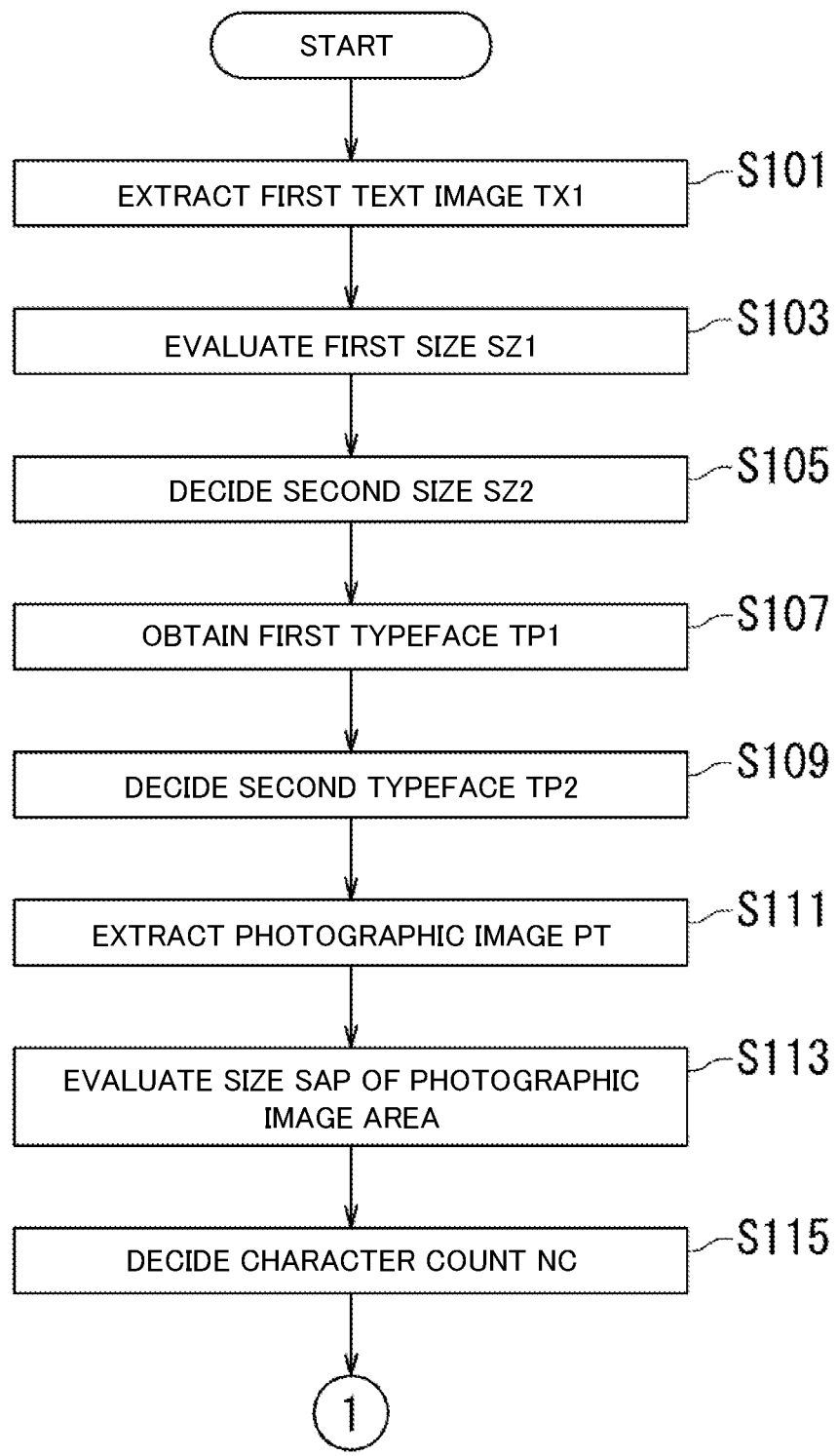
FIG. 4 is a flowchart illustrating a process of the controller according to the embodiment of the present disclosure.
Figure 5:
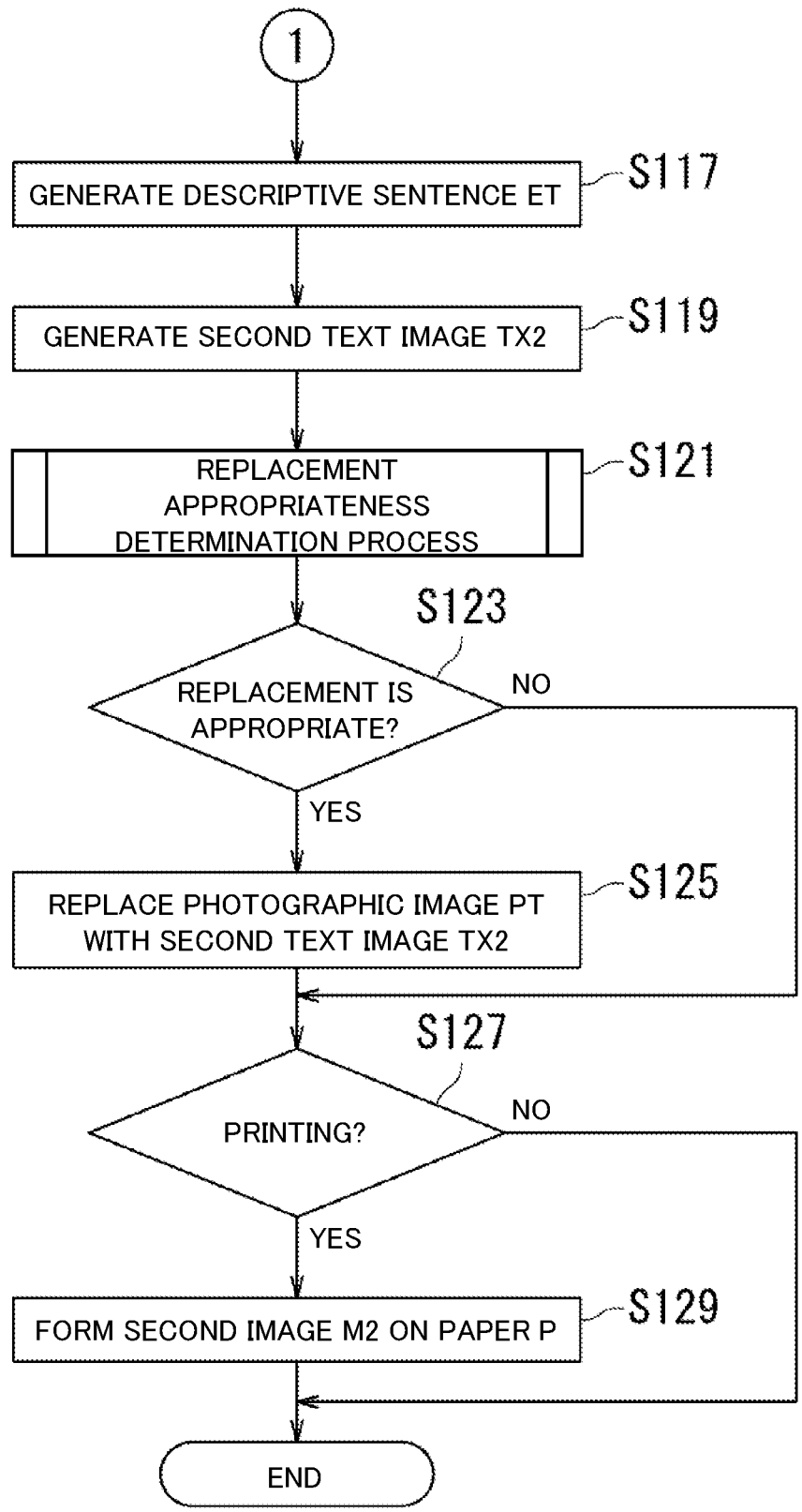
FIG. 5 is a flowchart illustrating a process of the controller according to the embodiment of the present disclosure.

A process of the controller 4 according to the embodiment of the present disclosure will be described with reference to FIG. 4 and FIG. 5. FIG. 4 and FIG. 5 are flowcharts each illustrating the process of the controller 4 according to the embodiment of the present disclosure.

Operations illustrated in FIG. 4 and FIG. 5 are started when a user instructs the image forming apparatus 100 through the PC 200 to print the first image M1 in an eco mode. The eco mode is a printing mode with a consumption amount of toner reduced as compared to a usual consumption amount of toner.

In step S101, the reception unit 401 receives the first image information MJ1 from the PC 200. The first decision unit 402 extracts the first text image TX1 from the first image information MJ1. The operation proceeds to step S103.

In step S103, the first decision unit 402 evaluates the first size SZ1 from the first text image TX1. The operation proceeds to step S105.

In step S105, the first decision unit 402 decides the second size SZ2, based on the first size SZ1. In step S103 and step S105, the first decision unit 402 decides the second size SZ2, based on the first image information MJ1. Therefore, step S103 and step S105 are examples of a character size decision step. The operation proceeds to step S107.

In step S107, the second decision unit 403 obtains the first typeface TP1 from the first text image TX1. The operation proceeds to step S109.

In step S109, the second decision unit 403 decides the second typeface TP2, based on the first typeface TP1. The operation proceeds to step S111.

In step S111, the third decision unit 404 extracts the photographic image PT from the first image information MJ1. The operation proceeds to step S113.

In step S113, the third decision unit 404 evaluates the size SAP of the photographic image area AP. The operation proceeds to step S115.

In step S115, the third decision unit 404 decides the character count NC of the descriptive sentence ET. The character count NC is decided based on the size and the typeface of the character included in the descriptive sentence ET, and the size SAP of the photographic image area AP and the size of the blank space. The operation proceeds to step S117 illustrated in FIG. 5.

In step S117, the generation unit 405 uses the artificial intelligence of the server device 300 to generate the descriptive sentence ET of the photographic image PT. The character count of the descriptive sentence ET falls within the character count NC. Step S117 is an example of a generation step. The operation proceeds to step S119.

In step S119, the generation unit 405 generates the second text image TX2 from the descriptive sentence ET. The operation proceeds to step S121. It is noted that operations of the image forming apparatus 100 after step S121 will be described with reference to FIG. 5.

Figure 6:
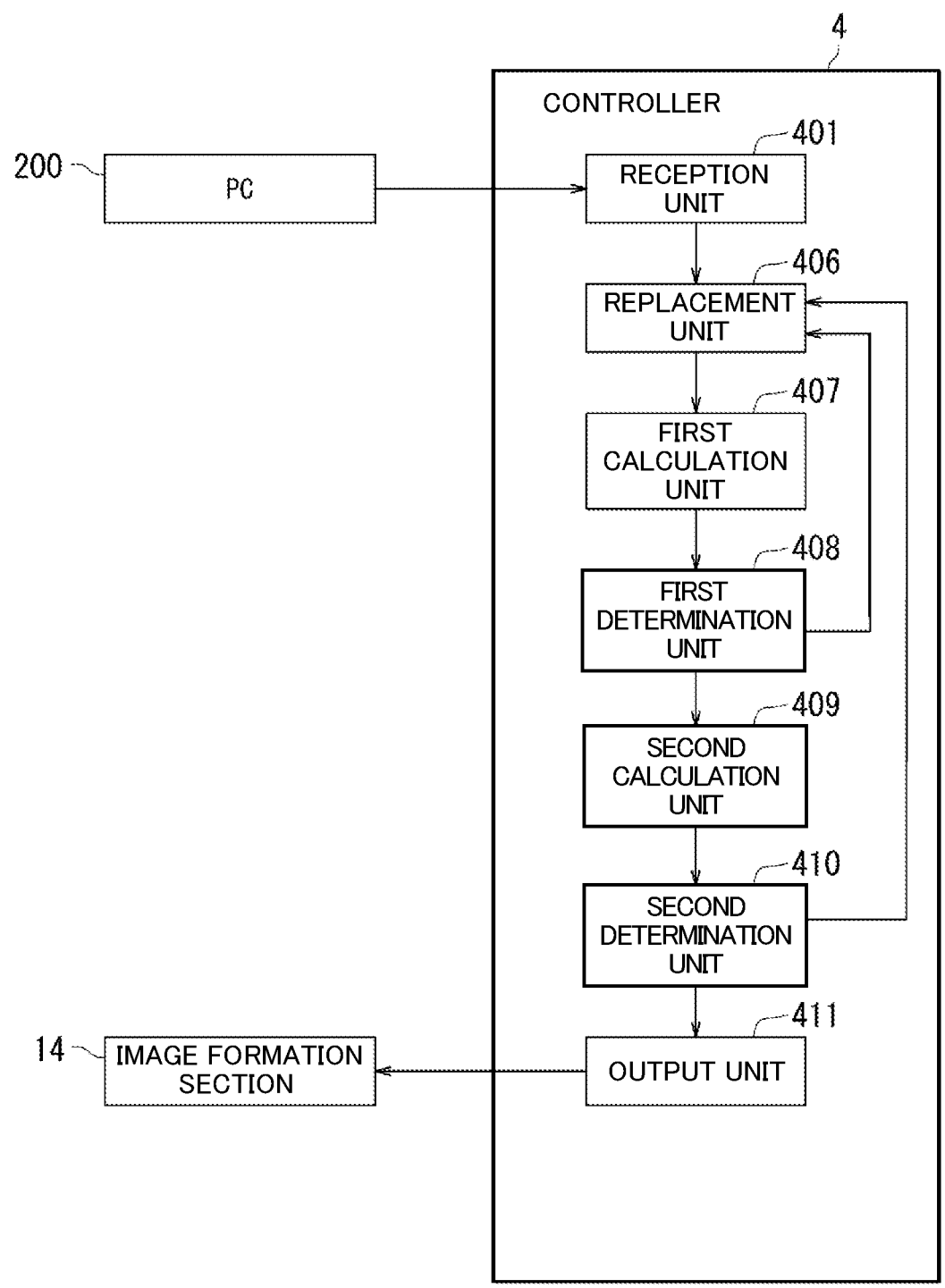
FIG. 6 is a diagram illustrating a remaining part of the configuration of the controller according to the embodiment of the present disclosure.

FIG. 6 is a diagram illustrating a part of the configuration of the controller 4 according to the embodiment of the present disclosure. FIG. 6 is a diagram in which the description of the part described in FIG. 3 is omitted.

As illustrated in FIG. 6, when executing the control program stored in the storage unit 42, the processor 41 of the controller 4 further functions as a first calculation unit 407, a first determination unit 408, a second calculation unit 409, and a second determination unit 410.

The first calculation unit 407 calculates a first consumption amount EX1 and a second consumption amount EX2. The first consumption amount EX1 indicates a consumption amount of toner consumed to form the photographic image PT on the paper P. The second consumption amount EX2 indicates a consumption amount of toner consumed to form the second text image TX2 on the paper P. The first calculation unit 407 is an example of a consumption amount calculation unit.

The toner consumption amount is calculated based on, for example, the number of pixels when the photographic image PT or the second text image TX2 is formed on the paper P. In general, as the number of pixels increases, the consumption amount of toner increases.

The first determination unit 408 determines whether to replace the photographic image PT with the second text image TX2, based on the first consumption amount EX1 and the second consumption amount EX2. Specifically, if the first consumption amount EX1 is larger than the second consumption amount EX2, the first determination unit 408 determines that the photographic image PT is replaced with the second text image TX2. On the contrary, if the second consumption amount EX2 is larger than the first consumption amount EX1, the first determination unit 408 determines that the photographic image PT is not replaced with the second text image TX2. The first determination unit 408 is an example of a consumption amount determination unit.

The second calculation unit 409 calculates a first data size DS1 and a second data size DS2. The first data size DS1 indicates a data size of image information corresponding to the photographic image PT. The second data size DS2 indicates a data size of text information corresponding to the second text image TX2. The image information includes information indicating the photographic image PT, the position of the photographic image area AP, and the size SAP of the photographic image area AP. The text information includes information indicating a content (character string) of the descriptive sentence ET, the second size SZ2, and the second typeface TP2. The second calculation unit 409 is an example of a data size calculation unit.

The second determination unit 410 determines whether to replace the photographic image PT with the second text image TX2, based on the first data size DS1 and the second data size DS2. Specifically, if the first data size DS1 is larger than the second data size DS2, the second determination unit 410 determines that the photographic image PT is replaced with the second text image TX2. On the contrary, if the second data size DS2 is larger than the first data size DS1, the second determination unit 410 determines that the photographic image PT is not replaced with the second text image TX2. The second determination unit 410 is an example of a data size determination unit.

Figure 7:
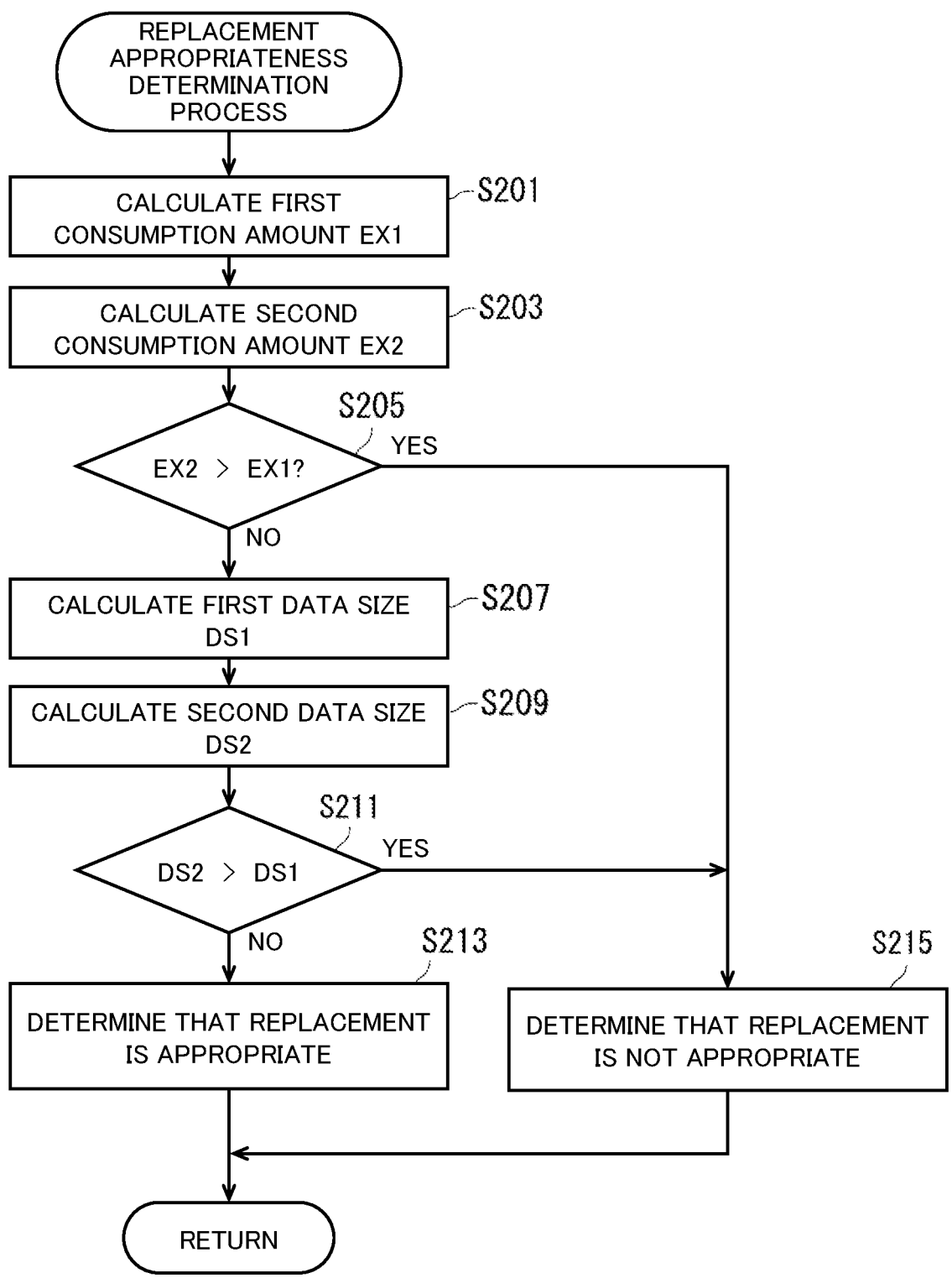
FIG. 7 is a flowchart illustrating a replacement appropriateness determination process.

Next, with reference to FIG. 5 and FIG. 7, the description of the process of the controller 4 according to the embodiment of the present disclosure will be continued.

As illustrated in FIG. 5, in step S121, the controller 4 executes "replacement appropriateness determination process". The replacement appropriateness determination process indicates a process of determining whether to replace the photographic image PT with the second text image TX2. The "replacement appropriateness determination process" will be described with reference to FIG. 7.

In step S123, the replacement unit 406 determines whether or not replacement is appropriate. If the replacement unit 406 determines that the replacement is appropriate (Yes in step S123), the operation proceeds to step S125. On the other hand, if the replacement unit 406 determines that the replacement is not appropriate (No in step S123), the operation proceeds to step S127.

In step S125, the replacement unit 406 replaces the photographic image PT with the second text image TX2. The replacement unit 406 generates the second image information MJ2 indicating the second image M2. Step S125 is an example of a replacement step. The operation proceeds to step S127.

In step S127, the output unit 411 displays a selection screen for the user to select whether to print. Detailed description of the selection screen is omitted.

While the selection screen is being displayed, the output unit 411 determines whether to print, based on the user's selection. If the output unit 411 determines that the printing is performed (Yes in step S127), the operation proceeds to step S129. On the contrary, if the output unit 411 determines that the printing is not performed (No in step S127), the second image M2 is not printed, and the operation illustrated in FIG. 4 and FIG. 5 is completed.

In step S129, the output unit 411 controls the image formation section 14 to form the second image M2 on the paper P. The image formation section 14 forms the second image M2 on the paper P, and the operation illustrated in FIG. 4 and FIG. 5 is completed.

Next, the "replacement appropriateness determination process" of the controller 4 will be described with reference to FIG. 7. FIG. 7 is a flowchart illustrating the replacement appropriateness determination process of the controller 4.

In step S201, the first calculation unit 407 calculates the first consumption amount EX1 from the image information corresponding to the photographic image PT. The operation proceeds to step S203.

In step S203, the first calculation unit 407 calculates the second consumption amount EX2 from the text information corresponding to the second text image TX2. The operation proceeds to step S205.

In step S205, the first determination unit 408 determines whether the second consumption amount EX2 is larger than the first consumption amount EX1. If the first determination unit 408 determines that the second consumption amount EX2 is larger than the first consumption amount EX1 (Yes in step S205), the operation proceeds to step S215. On the contrary, if the first determination unit 408 determines that the second consumption amount EX2 is not larger than the first consumption amount EX1 (No in step S205), the operation proceeds to step S207.

In step S207, the second calculation unit 409 calculates the first data size DS1 from the image information corresponding to the photographic image PT. The operation proceeds to step S209.

In step S209, the second calculation unit 409 calculates the second data size DS2 from the text information corresponding to the second text image TX2. The operation proceeds to step S211.

In step S211, the second determination unit 410 determines whether the second data size DS2 is larger than the first data size DS1. If the second determination unit 410 determines that the second data size DS2 is larger than the first data size DS1 (Yes in step S211), the operation proceeds to step S215. On the contrary, when the second determination unit 410 determines that the second data size DS2 is not larger than the first data size DS1 (No in step S211), the operation proceeds to step S213.

In step S213, the second determination unit 410 determines that the replacement is appropriate, and the replacement appropriateness determination process ends. The operation proceeds to step S123 in FIG. 5.

In step S215, the second determination unit 410 determines that the replacement is not appropriate, and the replacement appropriateness determination process ends. The operation proceeds to step S123 in FIG. 5.

Thus, the image forming apparatus 100 according to the embodiment of the present disclosure is described with reference to FIG. 1 to FIG. 7. The image forming apparatus 100 can replace the photographic image PT of the first image M1 including the first text image TX1 and the photographic image PT, with the descriptive sentence ET. Then, the image forming apparatus 100 can match the size and the typeface of the character included in the descriptive sentence ET, with the size and the typeface of the character included in the first text image TX1. Therefore, the image forming apparatus 100 can form an image with a good appearance on the paper P.

Thus, the embodiment of the present disclosure is described above with reference to the drawings. However, the present disclosure is not limited to the above embodiment, and can be implemented in various aspects without departing from the spirit of the present disclosure (for example, (1) to (5) illustrated below). The drawings schematically illustrate the respective constituent elements mainly for the sake of easy understanding, and the thickness, length, number or the like of each of the constituent elements illustrated may be different from the actual dimensions on account of preparation of the drawings. Further, the shapes, dimensions, and the like of the constituent elements illustrated in the above-described embodiment are merely examples, and are not particularly limited, and various modifications can be made without substantially departing from the configuration of the present disclosure.

(1) As described with reference to FIG. 1 to FIG. 7, in the embodiment of the present disclosure, the image forming apparatus 100 is a color multifunction peripheral, but the present disclosure is not limited thereto. The image forming apparatus 100 may be any apparatus capable of forming an image on the paper P. For example, the image forming apparatus 100 may be a monochrome multifunction peripheral. The image forming apparatus 100 may be a color printer or a monochrome printer.

(2) As described with reference to FIG. 1 to FIG. 7, in the embodiment of the present disclosure, the first image information MJ1 is received from the PC 200, but the present disclosure is not limited thereto. For example, the image information read by the image reading unit 2 may be used.

(3) As described with reference to FIG. 1 to FIG. 7, in the embodiment of the present disclosure, the server device 300 generates the descriptive sentence ET, but the present disclosure is not limited thereto. For example, the controller 4 of the image forming apparatus 100 may incorporate an artificial intelligence.

(4) As described with reference to FIG. 1 to FIG. 7, in the embodiment of the present disclosure, the size and the typeface of the character included in the second text image TX2 are determined in the order of the size and the typeface, but in the present disclosure, the order is not limited to this. For example, the size and the typeface of the character included in the second text image TX2 may be determined in the order of the typeface and the size.

(5) As described with reference to FIG. 1 to FIG. 7, in the embodiment of the present disclosure, the appropriateness to replace the photographic image PT is determined in the order of the consumption amount of toner and the data size, but in the present disclosure, the order is not limited thereto. For example, the appropriateness to replace the photographic image PT may be determined in the order of data size and consumption amount of toner.

What is claimed is:

1. An image forming apparatus, comprising:
an image formation unit that forms an image on a recording medium;
a character size decision unit that decides a size of a character included in a second text image, based on an image including a photographic image and a first text image;
a generation unit that generates a descriptive sentence of the photographic image; and a replacement unit that replaces the photographic image with the second text image, wherein the second text image indicates a text corresponding to the descriptive sentence.

2. The image forming apparatus according to claim 1, wherein the character size decision unit decides a second size so that a first size and the second size substantially match, the first size indicates a size of a character included in the first text image, and the second size indicates a size of a character included in the second text image.

3. The image forming apparatus according to claim 1, further comprising a typeface decision unit that decides a second typeface so that a first typeface and the second typeface match, wherein the first typeface indicates a typeface of a character included in the first text image, and the second typeface indicates a typeface of a character included in the second text image.

4. The image forming apparatus according to claim 1, further comprising a character count decision unit that decides a character count of the descriptive sentence, wherein the generation unit generates the descriptive sentence, based on the character count.

5. The image forming apparatus according to claim 4, wherein the character count decision unit decides the character count, based on a size of the photographic image and a size of a character included in the second text image.

6. The image forming apparatus according to claim 1, further comprising:

a consumption amount calculation unit that calculates a first consumption amount and a second consumption amount; and a consumption amount determination unit that determines whether to replace the photographic image with the second text image, based on the first consumption amount and the second consumption amount, wherein the image formation unit forms the image on the recording medium by consuming a toner, the first consumption amount indicates a consumption amount of the toner consumed to form the photographic image on the recording medium, and the second consumption amount indicates a consumption amount of the toner consumed to form the second text image on the recording medium.

7. The image forming apparatus according to claim 1, further comprising:

a data size calculation unit that calculates a first data size and a second data size; and a data size determination unit that determines whether to replace the photographic image with the second text image, based on the first data size and the second data size, wherein the first data size indicates a data size of image information corresponding to the photographic image, and the second data size indicates a data size of text information corresponding to the second text image.

8. An image forming method of an image forming apparatus for forming an image on a recording medium, comprising:

a character size decision step of deciding a size of a character included in a second text image, based on an image including a photographic image and a first text image, a generation step of generating a descriptive sentence of the photographic image; and a replacement step of replacing the photographic image with the second text image, wherein the second text image indicates a text corresponding to the descriptive sentence.

\* \* \* \* \*